(12) United States Patent
Bidnyk et al.

(10) Patent No.: US 7,068,885 B2
(45) Date of Patent: Jun. 27, 2006

(54) DOUBLE DIFFRACTION GRATING PLANAR LIGHTWAVE CIRCUIT

(75) Inventors: Serge Bidnyk, Ottawa (CA); Ashok Balakrishnan, Ottawa (CA); Matt Pearson, Ashton (CA)

(73) Assignee: Enablence, Inc., Kanata (CA)

( * ) Notice: Subject to any disclaimer, the term of this patent is extended or adjusted under 35 U.S.C. 154(b) by 105 days.

(21) Appl. No.: 10/923,987

(22) Filed: Aug. 24, 2004

(65) Prior Publication Data

US 2005/0213888 A1    Sep. 29, 2005

Related U.S. Application Data

(60) Provisional application No. 60/555,686, filed on Mar. 24, 2004, provisional application No. 60/557,711, filed on Mar. 31, 2004.

(51) Int. Cl.
*G02B 6/34* (2006.01)
*H04J 14/02* (2006.01)
*G02B 6/12* (2006.01)

(52) U.S. Cl. ............ 385/37; 385/129; 385/130; 385/14; 398/84; 398/87

(58) Field of Classification Search .......... 385/14, 385/37, 129, 130, 131, 132; 398/84, 87
See application file for complete search history.

(56) References Cited

U.S. PATENT DOCUMENTS

| | | | | |
|---|---|---|---|---|
| 4,634,215 A * | 1/1987 | Reule | ............... | 385/43 |
| 4,707,056 A * | 11/1987 | Bittner | ............... | 385/31 |
| 5,937,113 A | 8/1999 | He et al. | ............... | 385/11 |
| 6,125,223 A * | 9/2000 | Drozdowicz | ............... | 385/37 |
| 6,493,121 B1 | 12/2002 | Althaus | ............... | 359/152 |
| 6,636,658 B1 * | 10/2003 | Goodman et al. | ............... | 385/24 |
| 6,657,723 B1 * | 12/2003 | Cohen et al. | ............... | 356/328 |
| 6,694,102 B1 | 2/2004 | Baumann et al. | ............... | 398/138 |
| 6,731,882 B1 | 5/2004 | Althaus et al. | ............... | 398/139 |
| 6,757,460 B1 | 6/2004 | Melchior et al. | ............... | 385/31 |
| 2002/0176171 A1 | 11/2002 | Berolo et al. | ............... | 359/615 |
| 2005/0013541 A1 * | 1/2005 | Kittaka et al. | ............... | 385/37 |

FOREIGN PATENT DOCUMENTS

| | | |
|---|---|---|
| CA | 2279765 | 1/2000 |
| CA | 2364270 | 8/2000 |

\* cited by examiner

*Primary Examiner*—Brian Healy
(74) *Attorney, Agent, or Firm*—Teitelbaum & MacLean; Neil Teitelbaum; Doug MacLean

(57) ABSTRACT

The invention relates to a planar lightwave circuit including a pair of opposed concave reflective diffraction gratings sharing the same focal line, which separates first and second slab waveguide regions. The ends of input and output waveguides are positioned along the focal line for launching and receiving light directed by one or both of the diffraction gratings. The invention enables light within in a certain wavelength range to be launched from an input waveguide, directed by a single diffraction grating, and output waveguides, all within a single slab waveguide region, while light within another wavelength range will be directed from one diffraction grating to another for output waveguides in a different slab waveguide region.

20 Claims, 9 Drawing Sheets

DOUBLE DIFFRACTION GRATING PLANAR LIGHTWAVE CIRCUIT

CROSS-REFERENCE TO RELATED APPLICATIONS

The present invention claims priority from U.S. Patent Applications Nos. 60/555,686 filed Mar. 24, 2004, and 60/557,711 filed Mar. 31, 2004, which are incorporated herein by reference.

TECHNICAL FIELD

The present invention relates to a double diffraction grating planar lightwave circuit, and in particular to a planar lightwave circuit (PLC) optical triplexer for use in fiber-to-the-home (FTTH) optical networks.

BACKGROUND OF THE INVENTION

A triplexer or Voice-Data-Video (VDV) processor serves as an optical gateway from an FTTH optical network into a subscriber's home. A triplexer is an extremely compact and low-cost access device capable of receiving two high-speed channels (e.g. 1490 nm for telephone & internet, and 1550 nm for video), while simultaneously transmitting on a third channel (e.g. 1310 for information out). All these signals are multiplexed onto a single optical fiber for simple installation.

Typical triplexer requirements present considerable challenges to conventional PLC design techniques. The optical architecture requires that a laser, nominally 1310 nm in wavelength, is coupled to a single-mode fiber for transmitting optical signals from the home. In the other direction on that same fiber, light at wavelengths of nominally 1490 nm and 1550 nm from outside the home are captured, demultiplexed and directed to optical detectors. The difficulty arises due to the operational passbands at these wavelengths. At the 1310 nm channel, a band of 50 nm to 100 nm is expected, which provides a large margin within which the laser can operate essentially athermally, whereas bands of only 10 nm to 20 nm width are required for the detector channels. Furthermore, the laser diode operates in a single transverse mode, and the common input/output fiber is a single mode fiber; hence, the path followed by the laser channel must be at all points compatible with single-mode optics. In other words the laser channel's path must be reversible. In the prior art, especially those designs using a single diffractive structure in a PLC, there is no practical means of addressing a wide wavelength range (~1250 nm to 1600 nm) with channels having substantially different passbands.

Prior art devices, such as the one disclosed in U.S. Pat. No. 6,493,121 issued Dec. 10, 2002 to Althaus, and illustrated in FIG. 1, achieve the functionality of the VDV processor (triplexer 1) using a number of individually crafted thin film filters (TFF) 2a and 2b, placed in specific locations along a collimated beam path. The TFFs 2a and 2b are coupled with discrete lasers 3 and photo-detectors 4a and 4b, and packaged in separate transistor-outline (TO) cans 6 and then individually assembled into one component. An incoming signal with the two incoming channels (1490 nm and 1550 nm) enter the triplexer 1 via an optical fiber 7. The first channel is demultiplexed by the first TFF 2a and directed to the first photo-detector 4a, and the second channel is demultiplexed by the second TFF 2b and directed to the second photo-detector 4b. The outgoing channel (1310 nm) is generated in the laser 3 and output the optical fiber 7 via the first and second TFFs 2a and 2b. Unfortunately, the assembly of such a device is extremely labor intensive requiring all of the elements to be aligned with very low tolerances.

Attempts to simplify the housing structure and thereby the assembly process are disclosed in U.S. Pat. No. 6,731,882 issued May 4, 2004 to Althaus et al, and U.S. Pat. No. 6,757,460 issued Jun. 29, 2004 to Melchoir et al. Further advancements, illustrated in FIG. 2, involve mounting all of the elements on a semiconductor microbench ensuring repeatable and precise alignment. Unfortunately, all of these solutions still involve the alignment of TFFs with TO cans. An example of a prior art solution without TFFs is disclosed in U.S. Pat. No. 6,694,102 issued Feb. 17, 2004 to Baumann et al., which discloses a bi-directional multiplexer utilizing a plurality of Mach-Zehnder interferometers.

An object of the present invention is to overcome the shortcomings of the prior art by providing a planar lightwave circuit triplexer utilizing a dual diffraction grating arrangement providing usage over a wide wavelength range with channels of different passbands.

SUMMARY OF THE INVENTION

Accordingly, the present invention relates to a planar lightwave circuit wavelength division multiplexer/demultiplexer device comprising:

a slab waveguide defining first and second slab regions connected by a gap;

first and second face to face concave reflective diffraction gratings on either end of the slab waveguide;

a first waveguide extending to the first slab region;

a second waveguide extending to the first slab region; and a third waveguide extending to the second slab region;

wherein the first and second reflective gratings and the ends of the first, second and third waveguides are positioned, whereby light of a wavelength in a first range of wavelengths will pass between the first and second waveguides via the first grating, and whereby light of a wavelength in a second range of wavelengths, higher or lower than the first range of wavelengths, will pass between the first and third waveguides via the first and the second grating.

BRIEF DESCRIPTION OF THE DRAWINGS

The invention will be described in greater detail with reference to the accompanying drawings which represent preferred embodiments thereof, wherein.

DETAILED DESCRIPTION

Figure 2:
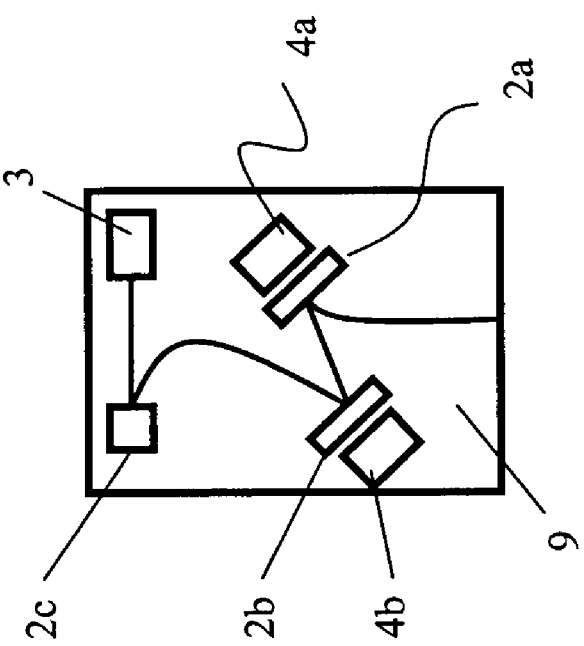
FIG. 2 illustrates a conventional thin film filter based triplexer utilizing a semiconductor substrate.
Figure 1:
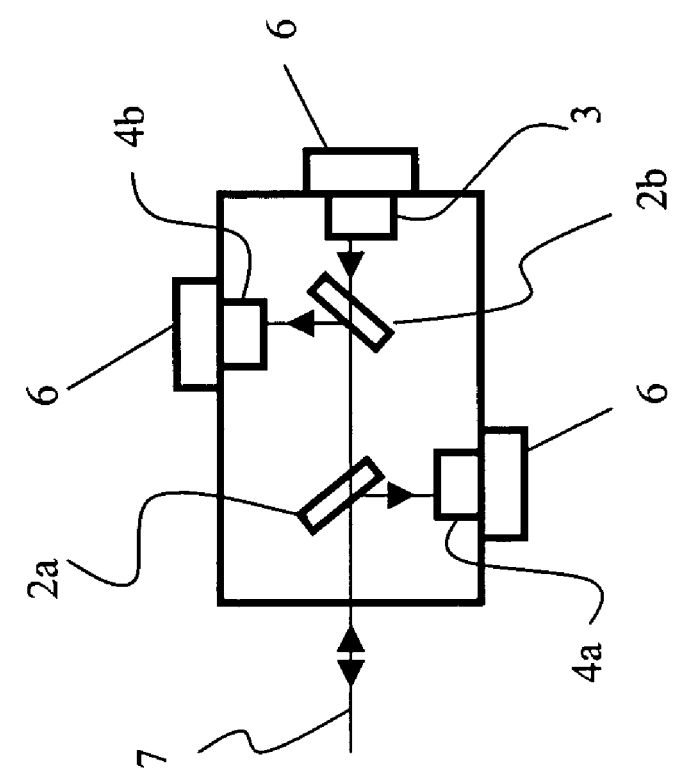
FIG. 1 illustrates a conventional thin film filter based triplexer.
Figure 3:
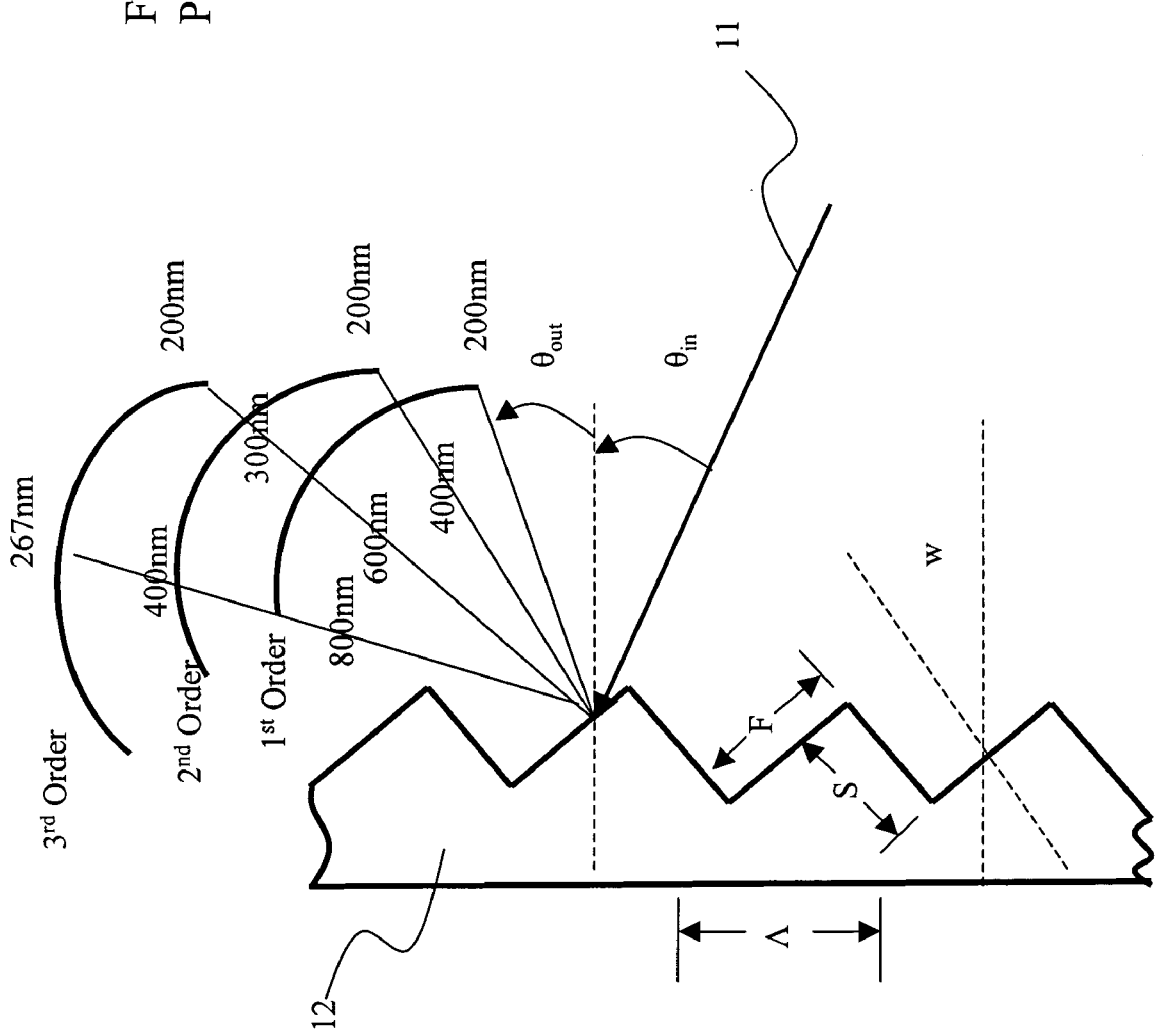
FIG. 3 illustrates a conventional reflective diffraction grating.

A planar waveguide reflective diffraction grating includes an array of facets arranged in a regular sequence. The performance of a simple diffraction grating is illustrated with reference to FIG. 3. An optical beam 11, with a plurality of wavelength channels $\lambda_1$, $\lambda_2$, $\lambda_3$ . . . , enters a diffraction grating 12, with grading pitch $\Lambda$ and diffraction order m, at a particular angle of incidence $\theta_{in}$. The optical beam is then angularly dispersed at an angle $\theta_{out}$ depending upon wavelength and the order, in accordance with the grating equation:

$$m\lambda = \Lambda(\sin\theta_{in} + \sin\theta_{out}) \quad (1)$$

From the grating equation (1), the condition for the formation of a diffracted order depends on the wavelength $\lambda_N$ of the incident light. When considering the formation of a spectrum, it is necessary to know how the angle of diffraction $\theta_{Nout}$ varies with the incident wavelength $\theta_{in}$. Accordingly, by differentiating the equation (1) with respect to $\theta_{Nout}$, assuming that the angle of incidence $\theta_{in}$ is fixed, the following equation is derived:

$$\partial\theta_{Nout}/\partial\lambda = m/\Lambda \cos\theta_{Nout} \quad (2)$$

The quantity $d\theta_{Nout}/d\lambda$ is the change of the diffraction angle $\theta_{Nout}$ corresponding to a small change of wavelength $\lambda$, which is known as the angular dispersion of the diffraction grating. The angular dispersion increases as the order m increases, as the grading pitch $\Lambda$ decreases, and as the diffraction angle $\theta_{Nout}$ increases. The linear dispersion of a diffraction grating is the product of this term and the effective focal length of the system.

Since light of different wavelengths $\lambda_N$ are diffracted at different angles $\theta_{Nout}$, each order m is drawn out into a spectrum. The number of orders that can be produced by a given diffraction grating is limited by the grating pitch $\Lambda$, because $\theta_{Nout}$ cannot exceed 90°. The highest order is given by $\Lambda/\lambda_N$. Consequently, a coarse grating (with large $\Lambda$) produces many orders while a fine grating may produce only one or two.

For a triplexer the relevant passbands are 100 nm for the laser, and ~20 nm for the detector channels. Such a device would be impractical to implement with a single diffractive structure because the various channels would s hare a common physical dispersion. Assume that a spectrometer slab region has been chosen such that the smallest reasonable guiding waveguide widths handle the 20 nm passbands at the grating output. The waveguide width necessary for the 100 nm passband channel would be so wide as to support innumerable modes, creating a device with high sensitivity to fabrication tolerances if a reversible path is necessary for this channel.

From equation (1) above, the output angle can be isolated, giving:

$$\sin\theta_{out} = \frac{m\lambda}{\Lambda} - \sin\theta_{in} \quad (3)$$

Equation (3) illustrates that the output angle $\theta_{out}$ varies directly with wavelength $\lambda_N$, assuming the input angle is constant, which is the case for a single multiplexed beam launched from a single waveguide at a first diffraction grating.

The following equation is derived from equation (1) by isolating the input angle $\theta_{in}$.

$$\sin\theta_{in} = \frac{m\lambda}{\Lambda} - \sin\theta_{out} \quad (4)$$

Thus, if a second grating is placed at the output of the first grating, and the order ($m_2$), the pitch ($\Lambda_2$) and the input/output angles are selected correctly, it is possible to stabilize the output angle of the second grating with respect to wavelength, as long as the variation in output angle of the first grating (Equation 3) is identical to the variation in input angle for the second grating (equation 4).

Figure 4:
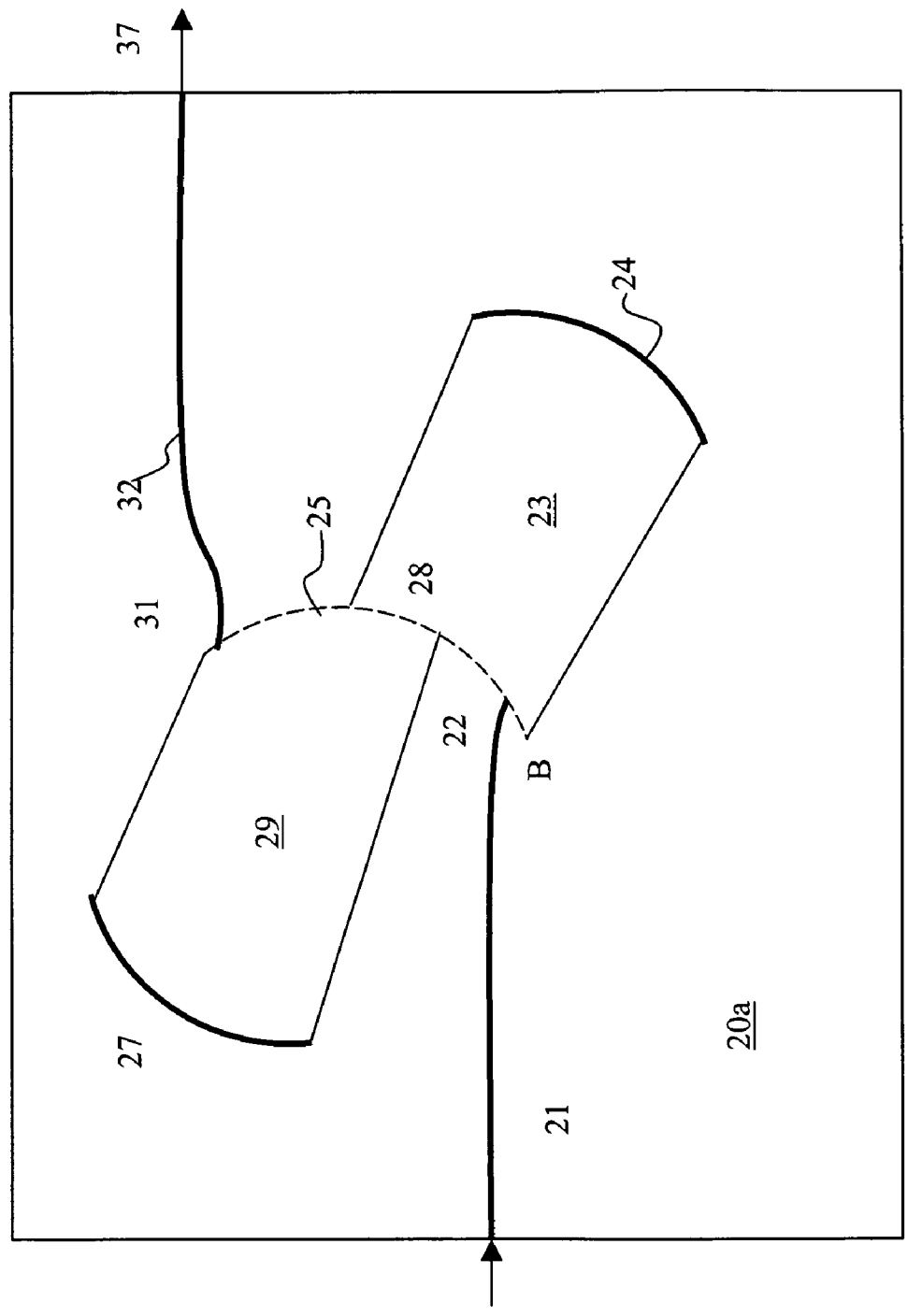
FIG. 4 illustrates a double diffraction grating arrangement according to the present invention with subtractive dispersion.

The basic operation of a subtractive double-grating architecture is illustrated in FIG. 4. Input light of a given range of wavelengths is launched from an edge of a planar lightwave circuit (PLC) 20a via an input waveguide 21. The input light arrives at an input 22 to a first slab waveguide region 23, which includes a first concave reflective diffraction grating 24. The first grating 24 focuses the light onto a focal line 26 at a position that varies with the wavelength. The focal line 26 (shown here as a Rowland circle, though other embodiments are possible) is also the focal line for a second concave reflective diffraction grating 27. The light from the first grating 24, which was focused along the focal line 26, passes through a gap 28 into a second slab waveguide 29 and illuminates the second grating 27. Light outside the given range of wavelengths does not pass through the gap 28, and could be collected by additional waveguides extending from the edge of the chip 20a to the first waveguide region 23, as hereinafter described. The second grating 27 re-focuses the light onto an output point 31, where it is captured by an output waveguide 32 and extracted. The location of the output point 31 and the parameters (order m and pitch $\Lambda$) of the second grating 27 are chosen to exactly compensate for the variation along the focal line 26 from the first grating 24 due to changes in wavelength. Consequently the light from the input waveguide 21 images onto the output point 31 and is extracted to the output of the device regardless of wavelength. The device is expected to have a flat transmission versus wavelength. In practice the transmission will not be completely wavelength independent for various reasons. The focal line 26 of the first grating 24 can only approximate the focal line of the second grating 27, except in the special case of flat-field design. Even still, the illumination of the second grating 27 will vary as the input position to the second grating 27 is varied along the focal line 26. Nonetheless, substantial flattening of the wavelength dependent transmission is achievable.

Figure 5:
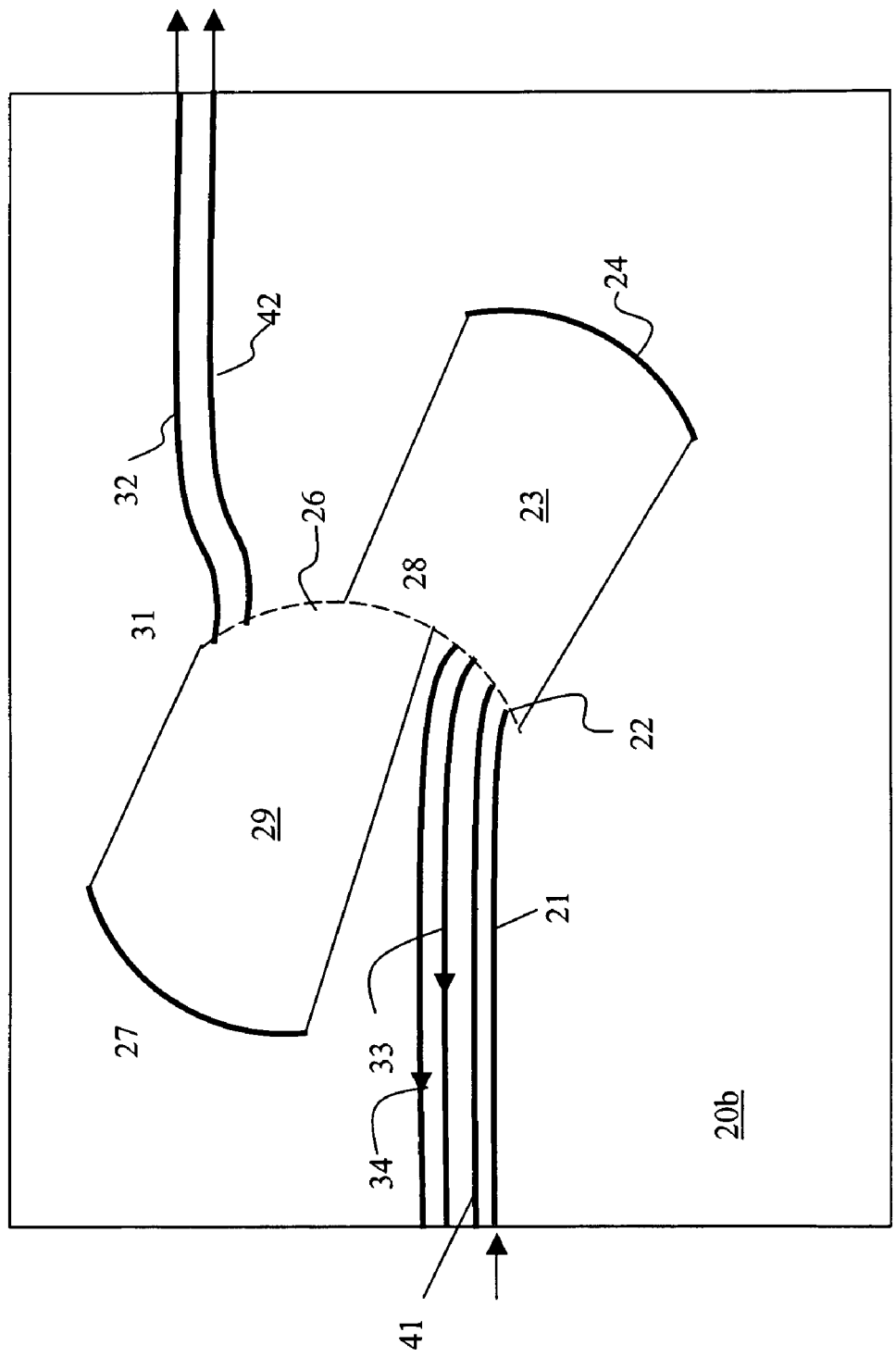
FIG. 5 illustrates an multiplexer/demultiplexer utilizing the double diffraction grating arrangement of FIG. 4.

With reference to FIG. 5, the subtractive double-grating device according to the present invention can also be used as a Wavelength Division Multiplexer/Demultiplexer, more specifically as a band drop or band pass-through multiplexer, in which light, with a plurality of wavelength channels, is launched via a first port, i.e. the input waveguide 21, at the first concave reflective grating 24. The first grating 24 separates one or more of the wavelength channels, within a first wavelength range, and focuses them on individual output waveguides, e.g. 33 and 34. The remaining light, i.e. in a second wavelength range with higher or lower wavelengths, passes through the gap 28 onto the second reflective grating 27, which directs and focuses the light, i.e. within the second wavelength range, onto the waveguide 32, with a passband up to 2, 3, 4 or 5 times wider than the channels output the output waveguides 33 and 34. Light, within the wavelength range which passes through the gap 28, launched into the first slab waveguide region 23 from another input waveguide 41, will couple to a different output waveguide, e.g. waveguide 42.

The same architecture can be used for multiplexing optical wavelength channels launched via the waveguide 32 with optical wavelength channels launched via the waveguides 33 and 34. The wavelength channels from the waveguide 32, within the second wavelength range, pass from the second grating 27, through the gap 28, off the first grating 24, onto the waveguide 21. The wavelength channels from the waveguides 33 and 34, within the first wavelength range, are directed off the first grating 24 onto the waveguide 21.

Figure 6:
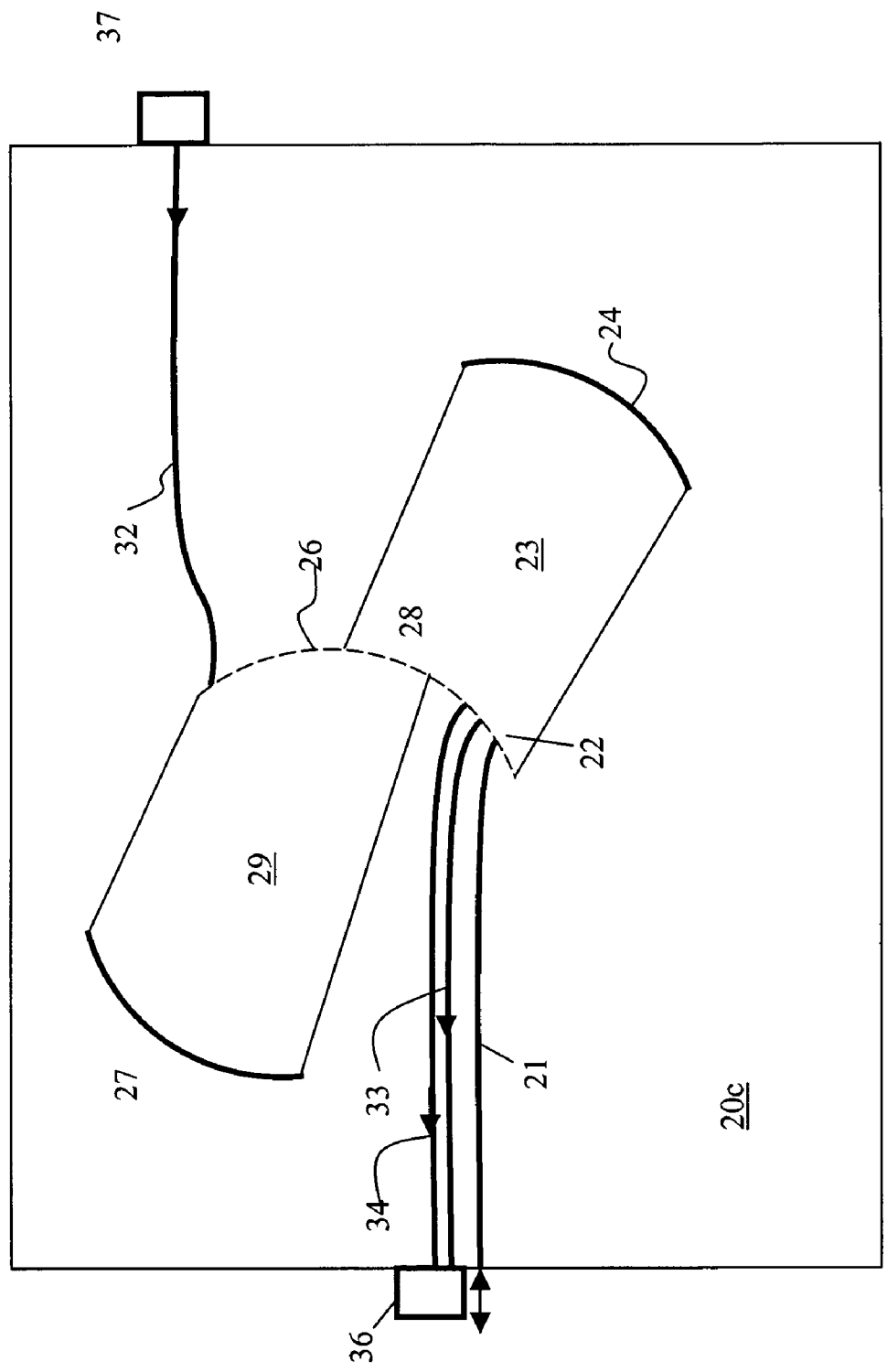
FIG. 6 illustrates a triplexer utilizing the double diffraction grating arrangement of FIG. 4.

With reference to FIG. 6, to create a triplexer, the features of FIGS. 4 and 5 are combined. Input light carrying the two (or more) information channels (e.g. 1490 nm and 1550 nm) is launched via the waveguide 21, which becomes an input/output waveguide optically coupled to an FITH optical network. The first concave reflective grating device 24 disperses the input light into selected wavelengths in a manner convenient with the 20 to 30 nm passbands, and focuses the dispersed sub-beams onto the ends of the first and second output waveguides 33 and 34, respectively, which lie along a focal line 26. If necessary, additional output waveguides can be added adjacent the first and second waveguides 33 and 34 to capture other desired wavelengths. An array of photo-detectors 36 (e.g. photodiodes) are placed at the opposite ends of the output waveguides 33 and 34 for converting the optical signals into electrical signals.

The outgoing signal light wavelength channel (or channels), e.g. at 1310 nm, traveling in the opposite direction, originates from a laser source 37 optically coupled to an edge of the PLC 20. The required physical dispersion is too high for the laser channel to be captured in one waveguide. Instead, the laser light is launched via the waveguide 32 extending to the focal line 26 into the second slab waveguide region 29 at the second concave reflective grating 27, which focuses the light along the focal line 26, and which directs the light through the gap 28 to the first concave reflective grating 24, which is shaped to collapse the dispersed radiation into the input/output waveguide 21. The physical wavelength dispersion of the second grating 27 is opposite to that of the first grating 24 (subtractive dispersion), thereby reducing, eliminating, or reversing the net physical dispersion with respect to wavelength for light experiencing both gratings. Since the reflective gratings 24 and 27 are aligned, as above, to stabilize the output angle for different wavelengths, the path followed by the laser channel is reversible for any wavelength in the range of wavelengths, which would travel through the gap 28.

Figure 7:
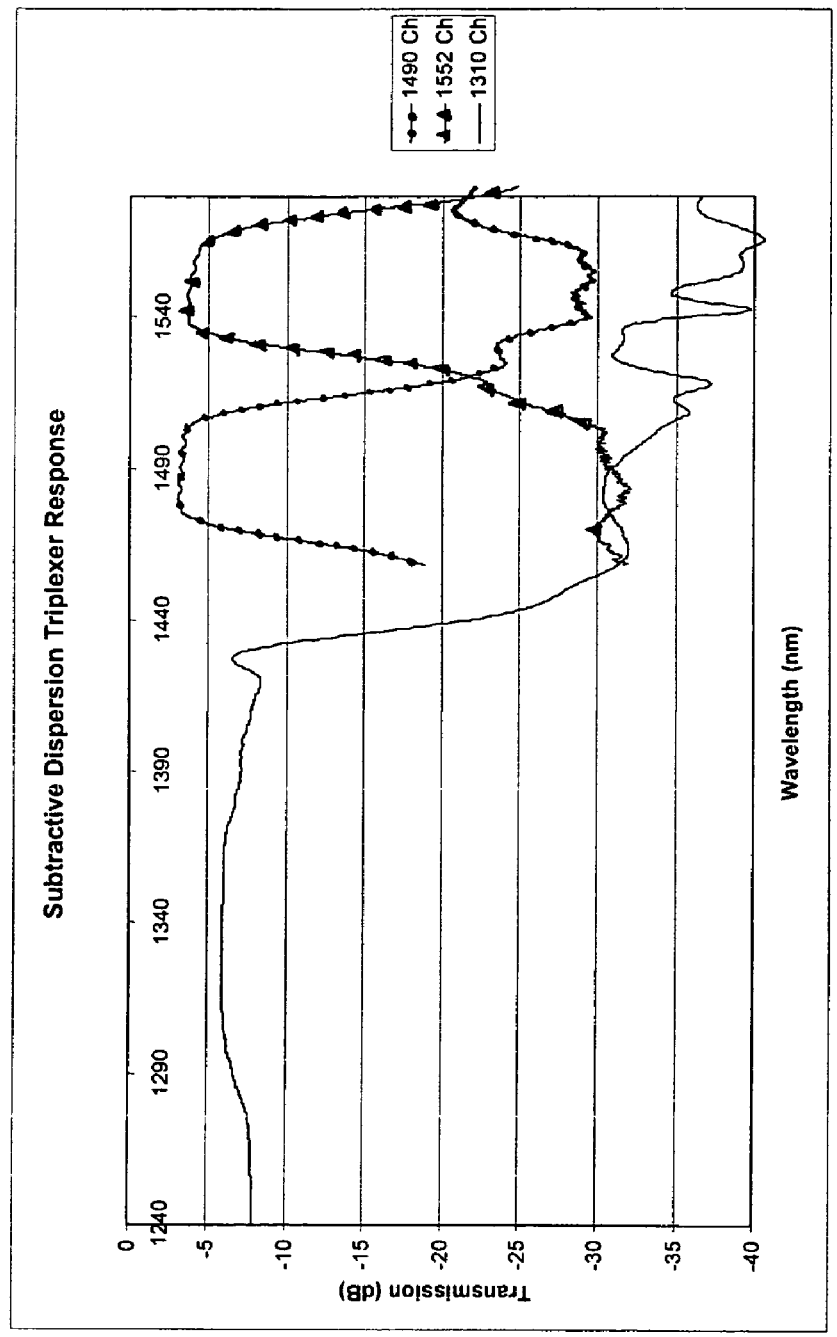
FIG. 7 illustrates a response of the subtractive triplexer of FIG. 4.

As demonstrated in FIG. 7, an extremely flat transmission passband over 100 nm wide is achieved for the ~1310 nm laser wavelength based on the use of two gratings in the subtractive dispersion configuration. The detector channels at 1490 nm and 1550 nm respectively encounter only one grating, and they are dispersed into narrow bands.

In the VDV processor, isolation of close to 50 dB is sometimes required between the laser source at 1310 nm and the receiver channels at 1490 and 1550 nm. In a grating-based device the main source of background light arises from scattering from defects on the facet profile. The facets themselves are arranged to create phase coherent interference to disperse and focus light in a wavelength specific manner. Corner rounding between the reflective facet and the non-reflective sidewall will also be periodic, and therefore spatially coherent, but with an inappropriate phase, leading toperiodic ghost images with low intensity. Facet roughness will be spatially incoherent, leading to random low-level background light. Thus, if a strong laser signal is incident on a grating and receiver channels are also obtained from that grating, the receiver channels will have a strong background contributed from the laser, at a level typically 30 dB below the strength of the laser. Isolation of ~50 dB is closer to the requirement for a practical VDV processor.

If a second grating is placed at the output of a first grating, and the order ($m_2$), pitch ($\Lambda_2$) and angles are chosen correctly, it i s also possible to vary the output angle of the second grating with respect to wavelength by taking advantage of both the change in wavelength and the change in input angle to the second grating due to the dispersion of the first grating.

Figure 8:
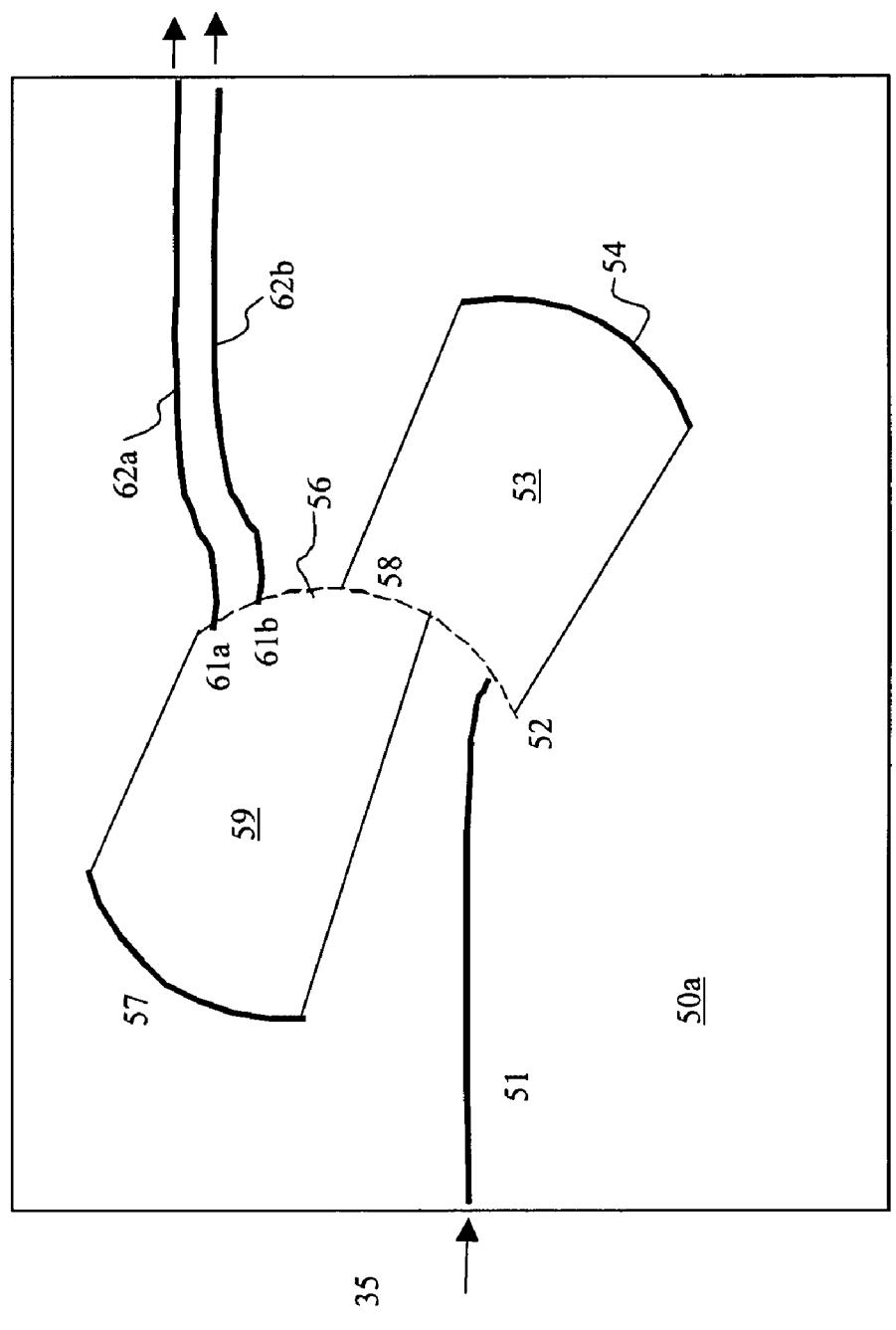
FIG. 8 illustrates a double diffraction grating arrangement according to the present invention with additive dispersion.

FIG. 8 illustrates the basic operation of an additive double diffraction grating architecture designed to improve the isolation of the laser from the receivers. An input signal, comprising a plurality of optical wavelength channels, is launched from an edge of a PLC 50*a* along an input waveguide 51 to an input port 52 of a first slab waveguide region 53. The signal is directed to a first concave diffraction grating 54, which disperses the input signal into constituent wavelength channels, and focuses them along a focal line 56 with position that varies with the wavelength. The focal line 56 (shown here as a Rowland circle, though other embodiments are possible) is also the focal line for a second concave diffraction grating 57. The light, which is within a specific wavelength range, travels through a gap 58, across a second waveguide region 59 to the second grating 57. The second grating 57 disperses the light even further, and re-focuses the various wavelength channels at output points 61*a*, 61*b* etc along the focal line 56, where they are captured by one of the output waveguides 62*a*, 62*b* etc, depending upon wavelength. The locations of the output points 61*a*, 61*b* etc, and the parameters (order m and pitch A) of the second grating 57, are chosen to enhance the variation along the focal line 56 from the second grating 57 due to changes in wavelength, creating an even greater physical dispersion at the output points 61*a*, 61*b* etc. Consequently the light from the input waveguide 51 images onto the output points 61*a*, 61*b* etc and is extracted to the output of the device with a dispersion that is greater than achievable with the first or second grating 54 and 57, respectively, alone. The device is expected to have a narrower transmission band versus wavelength as compared with a device using only one of the gratings.

Figure 9:
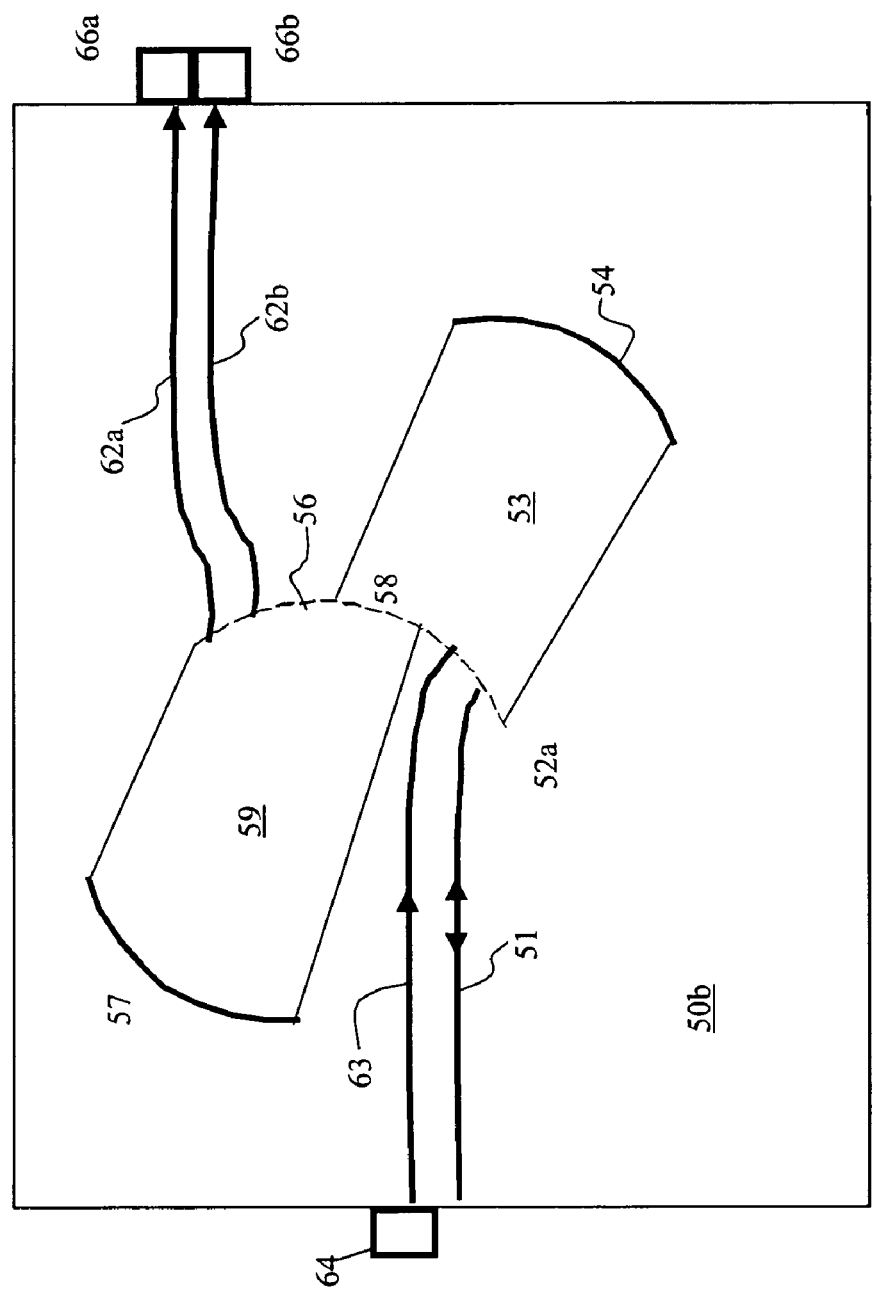
FIG. 9 illustrates an triplexer utilizing the additive double diffraction grating arrangement of FIG. 8.

With reference to FIG. 9, minor modifications, e.g. an additional input waveguide 63, have been made to the additive double diffraction grating of FIG. 8 to provide the functionality of a Triplexer. Laser light at 1310 nm enters from the edge of the chip 50*b* from laser 64 into the input guide 63, which has an end positioned on the focal line 56, and propagates through the first slab waveguide region 53 onto the first concave reflective grating device 54. The grating 54 multiplexes the input light in a manner convenient with the 100 nm passband of the laser channel into the first waveguide 51, acting as an input/output waveguide, which also has an end along the focal line 56. The light exits the first input/output waveguide 51 in the direction to the chip edge for transmission to a FTTH network. The incoming light at 1490 nm and 1550 nm enters the first input/ output waveguide 51 traveling in the direction opposite to the laser light at 1310 nm. The light at 1490 nm and 1550 nm propagates through the first slab waveguide 53 onto the first concave reflective grating device 54, to be dispersed near the focal line 56. The required physical dispersion of the light is designed to be too low to adequately distinguish the detector channels from this first grating device 54. The light propagates through the gap 58 to the second slab waveguide region 59 onto the second concave reflective grating 57, which is structured to enhance the dispersion, so that the 1490 nm and 1550 nm channels are dispersed sufficiently to be received by output waveguides 62a and 62b, respectively, the ends of which also lie on the focal line 56. The two channels with 20 nm to 30nm passbands exits towards the chip edge to enter photo-detectors 66a and 66b. The path followed by the laser channel is reversible for that particular wavelength band, i.e. 1260 to 1360 nm. Since the laser radiation at 1310 nm has been extracted immediately upon striking the first grating 54, the only radiation at 1310 nm striking the second grating 57 will arise from scattering off the first grating 54. The intensity is expected to be ~30 dB below the laser intensity. The radiation at 1310 nm is further attenuated by ~30 dB upon striking the second grating 57, as viewed at waveguides 62a or 62b, because those waveguides are positioned to capture radiation at 1490 and 1550 mn. Thus ~60 dB isolation of laser radiation from the detector channels should be possible. Accordingly, the Additive Dispersion architecture achieves an extremely high level of isolation.

Similar to the subtractive double diffraction grating architecture a first range of wavelengths launched from the input/output waveguide 51 or the input waveguide 63 is directed along the focal line 56, but stays in the first slab waveguide region 54, while a second range of wavelengths passes through the gap 58 to the second grating 57. Contrary to the subtractive architecture, the range of wavelengths containing the 1310 mn channel launched via the input/output waveguide 51 stays in the first slab waveguide region 53, while the range of wavelengths including the detector channels 1490 nm and 1550 nm passes through the gap 58 onto the second grating 57.

Figure 10:
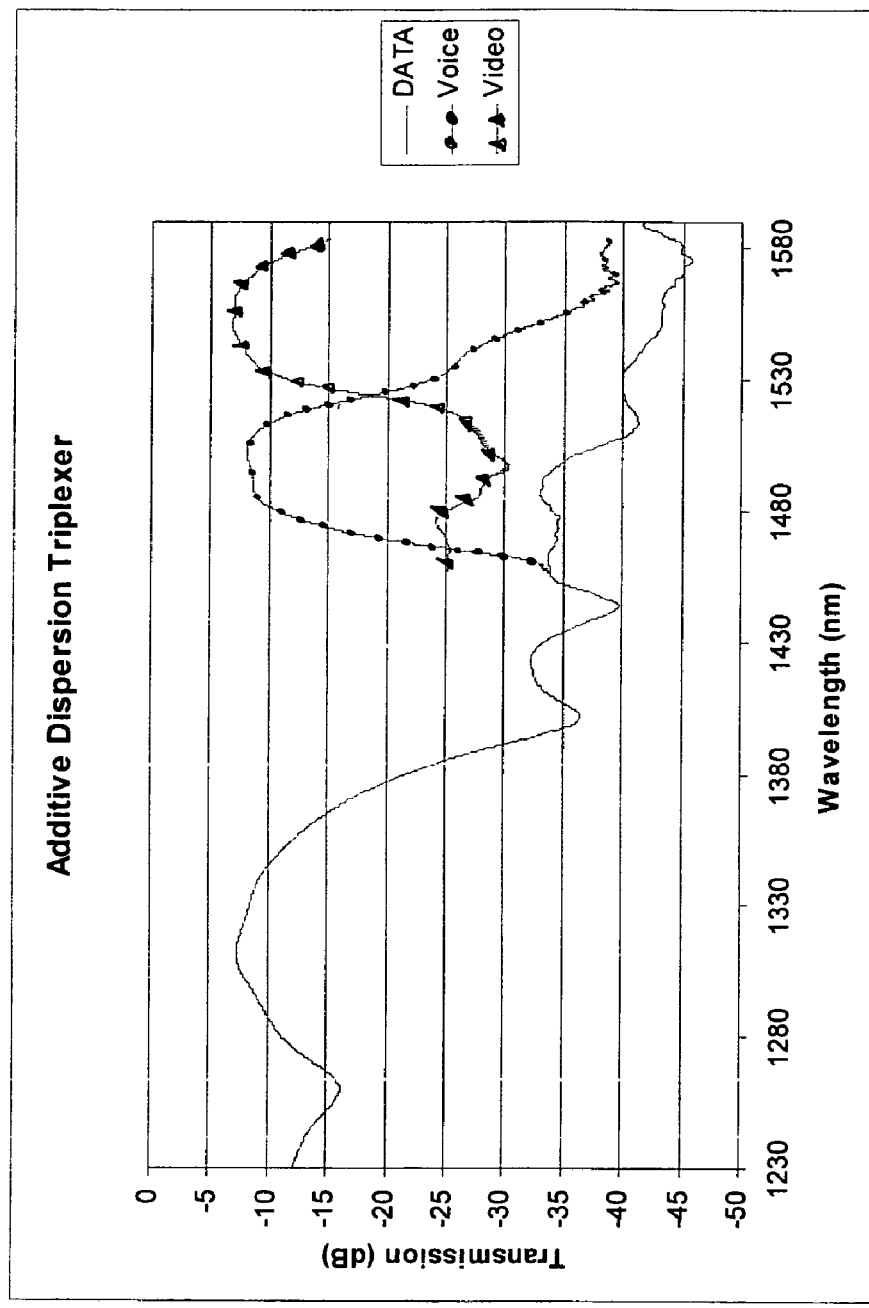
FIG. 10 illustrates a response of the additive triplexer of FIG. 8.

As demonstrated in FIG. 10, narrow transmission passbands are achieved for detector channels whereas the laser channel is quite broad. The detector channels at 1490 nm and 1552 nm respectively encounter two gratings, and they are dispersed into narrow bands, i.e. 20 nm to 30 nm wide. The 1310 nm radiation is extracted following only one grating, i.e. with a passband of over 100 nm, which improves the isolation of the laser radiation from detector channels to a level of over 45 dB in the case shown above. This level of isolation is significantly improved from the typical level of 30 dB from a standard grating, and is only made possible through the use of the dual-grating additive dispersion architecture.

We claim:

1. A planar lightwave circuit wavelength division multiplexer/demultiplexer device comprising:
   a slab waveguide defining first and second slab regions connected by a gap;
   first and second face to face concave reflective diffraction gratings on either end of the slab waveguide;
   a first waveguide extending to the first slab region;
   a second waveguide extending to the first slab region; and
   a third waveguide extending to the second slab region;
   wherein the first and second reflective gratings and the ends of the first, second and third waveguides are positioned, whereby light of a wavelength in a first range of wavelengths will pass between the first and second waveguides via the first grating, and whereby light of a wavelength in a second range of wavelengths, higher or lower than the first range of wavelengths, will pass between the first and third waveguides via the first and the second grating.

2. The device according to claim 1, wherein the first and second gratings have substantially the same focal line; and wherein ends of the first and second waveguide lie substantially along the focal line on one side of the gap, and an end of the third waveguide lies along the focal line on another side of the gap.

3. The device according to claim 2, wherein the focal line is defined by a Rowland circle.

4. The device according to claim 1, wherein physical dispersion of the second grating is opposite to that of the first grating, whereby substantially all optical wavelength channels within the second range of wavelengths will pass between the first and third waveguides.

5. The device according to claim 4, further comprising a fourth waveguide extending from the first slab region; wherein the first waveguide is capable of launching a first optical signal comprising first and second optical wavelength channels within the first range of wavelengths at the first grating; and wherein the first grating is capable of dispersing the first and second optical wavelength channels, and focusing the first and second optical wavelength channels onto the second and fourth waveguides, respectively.

6. The device according to claim 5, wherein the third waveguide is capable of launching a second optical signal comprising a third wavelength channel within the second range of wavelengths, which is focused onto the first waveguide via the first and second gratings.

7. The device according to claim 6, wherein optical wavelength channels reflected off of both the first and second diffraction gratings have a passband 2 to 5 times wider than optical wavelength channels reflected off of only the first diffraction grating.

8. The device according to claim 6, wherein the first and second channels have passbands of approximately 20 nm to 30 nm, respectively; and wherein the third channel has a passband of approximately 100 nm.

9. The device according to claim 8, wherein the first and second channels have passbands defined by center wavelengths of approximately 1490 nm and approximately 1550 nm, respectively; and wherein the third channel has a passband defined by a center wavelength of approximately 1310 nm.

10. The device according to claim 6, further comprising:
    a laser optically coupled to the third waveguide for generating the second optical signal; and
    first and second photo-detectors optically coupled to the second and fourth waveguides for converting the first and second optical wavelength channels into electrical signals.

11. The device according to claim 1, wherein physical dispersion of the second grating increases physical dispersion created by the first grating, whereby only one optical wavelength channel within the second range of wavelengths will pass between the first and third waveguides.

12. The device according to claim 11, further comprising a fourth waveguide extending from the second slab region; wherein the first waveguide is capable of launching a first optical signal comprising first and second optical wavelength channels within the second range of wavelengths at the first grating, which, in combination with the second grating, disperses and focuses the first and second optical wavelength channels onto the third and fourth waveguides, respectively.

13. The device according to claim 12, wherein the second waveguide is capable of launching a second optical signal comprising a third optical waveguide channel within the first range of wavelengths, which is focused onto the first waveguide via the first grating.

14. The device according to claim 13, wherein optical wavelength channels reflected off of only the first diffraction grating have a passband 2 to 5 times wider than optical wavelength channels reflected off of both the first and second diffraction gratings.

15. The device according to claim 13, wherein the first and second channels have passbands of substantially 20 nm to 30 nm, respectively; and wherein the third channel has a passband of substantially 100 nm.

16. The device according to claim 15, wherein the first and second channels have passbands defined by center wavelengths of substantially 1490 nm and 1550 nm, respectively; and wherein the third channel has a passband defined by a center wavelength of substantially 1310 nm.

17. The device according to claim 13, further comprising:
a laser optically coupled to the second waveguide for generating the second optical signal; and
first and second photo-detectors optically coupled to the third and fourth waveguides for converting the first and second optical wavelength channels into electrical signals.

18. The device according to claim 12, wherein the first optical signal also includes a third optical waveguide channel within the first range of wavelengths, which is focused onto the second waveguide via the first grating.

19. The device according to claim 1, wherein an optical wavelength channel within the first range of wavelengths launched from the second waveguide is multiplexed with another wavelength channel within the second range of wavelengths launched from the third waveguide onto the first waveguide.

20. The device according to claim 1, an optical wavelength channel within the first range of wavelengths and another wavelength channel within the second range of wavelengths launched from the first waveguide are demultiplexed and focussed onto the second and third waveguides, respectively.

* * * * *